US012006426B2

(12) United States Patent
Wang et al.

(10) Patent No.: US 12,006,426 B2
(45) Date of Patent: Jun. 11, 2024

(54) PROPYLENE RANDOM COPOLYMER FOR USE IN FILM APPLICATIONS

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersüss, Linz (AT)

(73) Assignee: BOREALIS AG, Vienna (AT)

( * ) Notice: Subject to any disclaimer, the term of this patent is extended or adjusted under 35 U.S.C. 154(b) by 638 days.

(21) Appl. No.: 17/273,700

(22) PCT Filed: Sep. 9, 2019

(86) PCT No.: PCT/EP2019/073987
§ 371 (c)(1),
(2) Date: Mar. 4, 2021

(87) PCT Pub. No.: WO2020/064313
PCT Pub. Date: Apr. 2, 2020

(65) Prior Publication Data
US 2021/0332227 A1 Oct. 28, 2021

(30) Foreign Application Priority Data
Sep. 26, 2018 (EP) .................................... 18196776

(51) Int. Cl.
| C08F 210/16 | (2006.01) |
| C08J 5/18 | (2006.01) |
| C08L 23/14 | (2006.01) |
| C08L 23/30 | (2006.01) |
| C09K 3/10 | (2006.01) |
| C08F 210/06 | (2006.01) |

(52) U.S. Cl.
CPC .......... *C08L 23/142* (2013.01); *C08F 210/16* (2013.01); *C08J 5/18* (2013.01); *C09K 3/10* (2013.01); *C08F 210/06* (2013.01); *C08F 2500/12* (2013.01); *C08F 2810/10* (2013.01); *C08J 2323/14* (2013.01); *C08J 2423/14* (2013.01); *C08L 23/30* (2013.01); *C08L 2203/162* (2013.01); *C08L 2205/025* (2013.01); *C09K 2003/1084* (2013.01); *C09K 2200/0617* (2013.01)

(58) Field of Classification Search
CPC .. C08F 210/16; C08F 210/06; C08F 2500/12; C08F 2810/10
See application file for complete search history.

(56) References Cited

U.S. PATENT DOCUMENTS

| 6,316,562 B1 | 11/2001 | Munck et al. |
| 6,723,829 B1 | 4/2004 | Malm et al. |
| 9,062,232 B2 * | 6/2015 | Reichelt ............... C08L 23/14 |
| 9,273,201 B2 * | 3/2016 | Reichelt ............ C09D 123/142 |
| 9,376,559 B2 * | 6/2016 | Holtcamp ............... C08L 23/08 |
| 9,527,935 B2 * | 12/2016 | Cavalieri ................ D01D 5/08 |
| 9,637,602 B2 | 5/2017 | Potter et al. |
| 9,670,293 B2 | 6/2017 | Reznichenko et al. |
| 9,670,347 B2 | 6/2017 | Tölsch et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,944,780 B2 * | 4/2018 | Wang ..................... C08L 23/14 |
| 9,976,020 B2 | 5/2018 | Nummila-Pakarinen et al. |
| 9,988,523 B2 | 6/2018 | Tranninger et al. |
| 9,994,003 B2 | 6/2018 | Fiebig et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,230,638 B2 * | 1/2022 | Gahleitner ................. C08J 5/18 |
| 11,292,900 B2 | 4/2022 | Gahleitner et al. |
| 11,299,617 B2 | 4/2022 | Prieto et al. |

(Continued)

FOREIGN PATENT DOCUMENTS

| CN | 102858869 A | 1/2013 |
| CN | 103608174 A | 2/2014 |

(Continued)

OTHER PUBLICATIONS

U.S. Appl. No. 17/995,997, filed Oct. 12, 2022.
Intellectual Property India, Hearing Notice in Indian Patent Application No. 202117016024 (May 12, 2022).
Intellectual Property India, Office Action in Indian Patent Application No. 202117016024 (dated Oct. 21, 2021).
Castignolles et al., "Detection and quantification of branching in polyacrylates by size-exclusion chromatography (SEC) and melt-state $^{13}$C NMR spectroscopy," *Polymer* 50(11): 2373-2383 (2009).
Filip et al., "Heteronuclear decoupling under fast MAS by a rotor-synchronized Hahn-echo pulse train," *J. Magnet. Reson.* 176: 239-243 (2005).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45: S198-S208 (2007).

(Continued)

*Primary Examiner* — Rip A Lee
(74) *Attorney, Agent, or Firm* — Leydig, Voit & Mayer, Ltd.

(57) ABSTRACT

The present invention is directed to a polypropylene composition (P) comprising a bimodal copolymer of propylene and 1-hexene prepared in the presence of a metallocene catalyst, said bimodal copolymer having a melt flow rate MFR2 in the range of 4.0 to 20.0 g/10 min. Further, the present invention is directed to a method for preparing the copolymer (C) and an article comprising said polypropylene composition (P).

16 Claims, No Drawings

(56) References Cited

U.S. PATENT DOCUMENTS

| | | | |
|---|---|---|---|
| 11,390,732 | B2 | 7/2022 | Van Houcke et al. |
| 11,492,478 | B2 | 11/2022 | Kniesel et al. |
| 11,504,949 | B2 | 11/2022 | Oderkerk et al. |
| 11,518,863 | B2 | 12/2022 | Vijay |
| 11,530,321 | B2 | 12/2022 | Kniesel et al. |
| 11,618,794 | B2 * | 4/2023 | Wang ................ C08F 8/00 526/126 |
| 2010/0249329 | A1 | 9/2010 | Grein et al. |
| 2010/0272939 | A1 | 10/2010 | Fiebig et al. |
| 2013/0005902 | A1 | 1/2013 | Doshev et al. |
| 2013/0267660 | A1 | 10/2013 | Leskinen et al. |
| 2014/0005337 | A1 | 1/2014 | Hallot et al. |
| 2016/0152810 | A1 | 6/2016 | Resconi et al. |
| 2016/0185946 | A1 | 6/2016 | Sandholzer et al. |
| 2016/0194486 | A1 | 7/2016 | Sandholzer et al. |
| 2016/0200838 | A1 | 7/2016 | Reznichenko et al. |
| 2016/0208085 | A1 | 7/2016 | Gloger et al. |
| 2016/0229158 | A1 | 8/2016 | Cavacas et al. |
| 2016/0237270 | A1 | 8/2016 | Wang et al. |
| 2016/0244539 | A1 | 8/2016 | Resconi et al. |
| 2016/0272740 | A1 | 9/2016 | Wang et al. |
| 2016/0280899 | A1 | 9/2016 | Töltsch et al. |
| 2016/0304681 | A1 | 10/2016 | Potter et al. |
| 2016/0311951 | A1 | 10/2016 | Reichelt et al. |
| 2016/0311988 | A1 | 10/2016 | Potter et al. |
| 2016/0312018 | A1 | 10/2016 | Vestberg et al. |
| 2016/0312019 | A1 | 10/2016 | Lampela et al. |
| 2016/0333175 | A1 | 11/2016 | Wang et al. |
| 2016/0347943 | A1 | 12/2016 | Wang et al. |
| 2016/0347944 | A1 | 12/2016 | Wang et al. |
| 2017/0009068 | A1 | 1/2017 | Kahlen et al. |
| 2017/0029980 | A1 | 2/2017 | Wang et al. |
| 2017/0137617 | A1 | 5/2017 | Wang et al. |
| 2017/0166711 | A1 | 6/2017 | Boragno et al. |
| 2017/0218172 | A1 | 8/2017 | Wang et al. |
| 2017/0313867 | A1 | 11/2017 | Lampela et al. |
| 2017/0321048 | A1 | 11/2017 | Nummila-Pakarinen et al. |
| 2018/0079875 | A1 | 3/2018 | Braun et al. |
| 2018/0194881 | A1 | 7/2018 | Denifl et al. |
| 2020/0263015 | A1 | 8/2020 | Kniesel et al. |
| 2020/0270434 | A1 | 8/2020 | Van Houcke et al. |
| 2020/0277479 | A1 | 9/2020 | Jerabek et al. |
| 2020/0308353 | A1 | 10/2020 | Jerabek et al. |
| 2020/0347216 | A1 | 11/2020 | Kniesel et al. |
| 2020/0392321 | A1 | 12/2020 | Gahleitner et al. |
| 2021/0114352 | A1 | 4/2021 | Oderkerk et al. |
| 2021/0171749 | A1 | 6/2021 | Kumar et al. |
| 2021/0171750 | A1 | 6/2021 | Gahleitner et al. |
| 2021/0214527 | A1 | 7/2021 | Gahleitner et al. |
| 2021/0214533 | A1 | 7/2021 | Kulshreshtha et al. |
| 2021/0238376 | A1 | 8/2021 | Kahlen et al. |
| 2021/0253836 | A1 | 8/2021 | Gahleitner et al. |
| 2021/0269560 | A1 | 9/2021 | Krallis et al. |
| 2021/0324189 | A1 | 10/2021 | Prieto et al. |
| 2021/0332227 | A1 | 10/2021 | Wang et al. |
| 2021/0339509 | A1 * | 11/2021 | Wang ................ B32B 27/32 |
| 2021/0347155 | A1 * | 11/2021 | Wang ................ B32B 27/18 |
| 2021/0347971 | A1 * | 11/2021 | Wang ................ C08F 2/001 |
| 2022/0033631 | A1 | 2/2022 | Gloger et al. |
| 2022/0135779 | A1 * | 5/2022 | Wang ................ C08F 2/00 525/240 |
| 2022/0204719 | A1 | 6/2022 | Vijay |
| 2022/0227965 | A1 | 7/2022 | Ruemer et al. |
| 2022/0251256 | A1 | 8/2022 | Wang et al. |
| 2022/0289955 | A1 | 9/2022 | Kahlen et al. |
| 2022/0306844 | A1 | 9/2022 | Kahlen et al. |
| 2022/0315716 | A1 | 10/2022 | Prieto et al. |
| 2022/0356330 | A1 | 11/2022 | Kahlen et al. |
| 2023/0046086 | A1 | 2/2023 | Al-Haj Ali et al. |
| 2023/0047329 | A1 | 2/2023 | Al-Haj-Ali |

FOREIGN PATENT DOCUMENTS

| | | | |
|---|---|---|---|
| CN | 103649137 A | 3/2014 | |
| CN | 103781614 A | 5/2014 | |
| CN | 107250177 A | 10/2017 | |
| CN | 108290982 A | 7/2018 | |
| EA | 022161 B1 | 11/2015 | |
| EP | 0 129 368 A1 | 12/1981 | |
| EP | 0 260 130 A1 | 3/1988 | |
| EP | 0 423 101 A2 | 4/1991 | |
| EP | 0 537 130 A1 | 4/1993 | |
| EP | 0 887 379 A1 | 12/1998 | |
| EP | 1 741 725 A1 | 1/2007 | |
| EP | 2 386 603 A1 | 11/2011 | |
| EP | 2 661 466 A1 | 11/2013 | |
| EP | 3 064 548 A1 | 9/2016 | |
| EP | 3 896 101 A1 * | 10/2021 | ............ C08F 210/06 |
| RU | 2443729 C2 | 2/2012 | |
| RU | 2448992 C2 | 4/2012 | |
| RU | 2499804 C1 | 11/2013 | |
| RU | 2602894 C2 | 11/2016 | |
| RU | 2016127547 A | 2/2018 | |
| RU | 2668075 C2 | 9/2018 | |
| WO | WO 92/12182 A1 | 7/1992 | |
| WO | WO 97/28170 A1 | 8/1997 | |
| WO | WO 98/46616 A1 | 10/1998 | |
| WO | WO 98/49208 A1 | 11/1998 | |
| WO | WO 98/56831 A1 | 12/1998 | |
| WO | WO 98/58976 A1 | 12/1998 | |
| WO | WO 99/12981 A1 | 3/1999 | |
| WO | WO 99/19335 A1 | 4/1999 | |
| WO | WO 00/34341 A2 | 6/2000 | |
| WO | WO 2011/131639 A1 | 10/2011 | |
| WO | WO 2012/093099 A1 | 7/2012 | |
| WO | WO 2013/007650 A1 | 1/2013 | |
| WO | WO 2013/030314 A1 | 3/2013 | |
| WO | WO 2015/011135 A1 | 1/2015 | |
| WO | WO 2017/097578 A1 | 6/2017 | |

OTHER PUBLICATIONS

Jönsson, "Nomenclature for non-linear chromatography (IUPAC Recommendations 1996)," *Pure Appl. Chem.* 68(8): 1591-1595 (1996).

Klimke et al., "Optimisation and Application of Polyolefin Branch Quantification by Melt-State $^{13}$C NMR Spectroscopy," *Macromol. Chem. Phys.* 207(4): 382-395 (2006).

Parkinson et al., "Effect of Branch Length on $^{13}$C NMR Relaxation Properties in Molten Poly[ethylene-co-(a-olefin)] Model Systems," *Macromol. Chem. Phys.* 208(19-20): 2128-2133 (2007).

*Plastics Additives Handbook*, 6th edition, Hans Zweifel, Editor, Hanser Publishers, Munich, pp. 1141-1190 (2009).

Pollard et al., "Observation of Chain Branching in Polyethylene in the Solid State and Melt via 13C NMR Spectroscopy and Melt NMR Relaxation Time Measurements," *Macromolecules* 37(3): 813-825 (2004).

Resconi et al., "Selectivity in Propene Polymerization with Metallocene Catalysts," *Chem. Rev.* 100(4):1253-1345 (2000).

European Patent Office, Extended European Search Report in European Patent Application No. 18 196 776.1 (dated Mar. 7, 2019).

European Patent Office, International Search Report in International Application No. PCT/EP2019/073987 (dated Dec. 4, 2019).

European Patent Office, Written Opinion in International Application No. PCT/EP2019/073987 (dated Dec. 4, 2019).

International Bureau of WIPO, International Preliminary Report on Patentability in International Application No. PCT/EP2019/073987 (dated Mar. 23, 2021).

Federal Institute of Industrial Property, Office Action issued in Russian Patent Application No. 2021108382/04 (dated Feb. 10, 2022).

The Patent Office of the People's Republic of China, First Notification Of Office Action issued in Chinese Patent Application No. 201980057350.2 (dated Sep. 20, 2022).

U.S. Appl. No. 17/413,612, filed Jun. 14, 2021.

U.S. Appl. No. 17/624,609, filed Jan. 4, 2022.

(56) References Cited

OTHER PUBLICATIONS

U.S. Appl. No. 17/623,657, filed Dec. 29, 2021.
U.S. Appl. No. 17/622,891, filed Dec. 27, 2021.
U.S. Appl. No. 17/635,764, filed Feb. 16, 2022.
U.S. Appl. No. 17/635,838, filed Feb. 16, 2022.
U.S. Appl. No. 17/635,892, filed Feb. 16, 2022.
Qingnian, Li, "New technology of design, production and processing of film products and Practical encyclopedia of applying new technology", vol. 1: p. 259 (2004).
Dingyi, Hong, *Polypropylene-Principle, Process and Technology, Sinopec Press*, p. 423 (2002).
The Patent Office of the People's Republic of China, Second Notification Of Office Action issued in Chinese Patent Application No. 201980057350.2 (dated Jun. 8, 2023).
U.S. Appl. No. 15/741,861, filed Jan. 4, 2018.
U.S. Appl. No. 16/633,699, filed Jan. 24, 2020.
U.S. Appl. No. 16/652,115, filed Mar. 30, 2020.
U.S. Appl. No. 17/276,322, filed Mar. 15, 2021.
U.S. Appl. No. 17/791,987, filed Jul. 11, 2022.
U.S. Appl. No. 17/792,003, filed Jul. 11, 2022.
U.S. Appl. No. 14/914,501, filed Feb. 25, 2016.
U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.
U.S. Appl. No. 15/106,101, filed Jun. 17, 2016.
U.S. Appl. No. 15/103,783, filed Jun. 10, 2016.
U.S. Appl. No. 15/039,107, filed May 25, 2016.
U.S. Appl. No. 15/103,744, filed Jun. 10, 2016.
U.S. Appl. No. 15/102,628, filed Jun. 8, 2016.
U.S. Appl. No. 15/113,907, filed Jul. 25, 2016.
U.S. Appl. No. 15/113,922, filed Jul. 25, 2016.
U.S. Appl. No. 15/113,517, filed Jul. 22, 2016.
U.S. Appl. No. 15/115,929, filed Aug. 2, 2016.
U.S. Appl. No. 15/310,283, filed Nov. 10, 2016.
U.S. Appl. No. 15/514,641, filed Mar. 27, 2017.
U.S. Appl. No. 15/531,974, filed May 31, 2017.
U.S. Appl. No. 15/526,957, filed May 15, 2017.
U.S. Appl. No. 15/566,588, filed Oct. 13, 2017.
U.S. Appl. No. 16/761,743, filed May 5, 2020.
U.S. Appl. No. 16/761,757, filed May 5, 2020.
U.S. Appl. No. 16/763,014, filed May 11, 2020.
U.S. Appl. No. 16/763,001, filed May 11, 2020.
U.S. Appl. No. 16/768,330, filed May 29, 2020.
U.S. Appl. No. 16/982,385, filed Sep. 18, 2020.
U.S. Appl. No. 17/050,550, filed Oct. 26, 2020.
U.S. Appl. No. 17/052,233, filed Nov. 2, 2020.
U.S. Appl. No. 17/047,350, filed Oct. 13, 2020.
U.S. Appl. No. 15/733,971, filed Dec. 1, 2020.
U.S. Appl. No. 17/259,216, filed Jan. 11, 2021.
U.S. Appl. No. 16/973,673, filed Dec. 9, 2020.
U.S. Appl. No. 17/273,687, filed Mar. 4, 2021.
U.S. Appl. No. 17/273,711, filed Mar. 4, 2021.
U.S. Appl. No. 17/276,275, filed Mar. 15, 2021.

\* cited by examiner

PROPYLENE RANDOM COPOLYMER FOR USE IN FILM APPLICATIONS

CROSS-REFERENCE TO RELATED APPLICATIONS

This application is the U.S. national phase of International Application No. PCT/EP2019/073987, filed on Sep. 9, 2019, which claims the benefit of European Patent Application No. 18196776.1, filed Sep. 26, 2018, the disclosures of which are incorporated herein by reference in their entireties for all purposes.

The present invention is directed to a polypropylene composition (P) comprising a bimodal copolymer (C) of propylene and 1-hexene prepared in the presence of a metallocene catalyst, said bimodal copolymer (C) having a melt flow rate MFR$_2$ in the range of 4.0 to 20.0 g/10 min. Further, the present invention is directed to a method for preparing the copolymer (C) and an article comprising said polypropylene composition (P).

Polypropylene is widely used in different applications such as cast films and sealing layers for cast films. Commonly used polypropylenes for sealing layer applications are terpolymers of propylene, ethylene and butene (C2C3C4) or propylene-ethylene random copolymers prepared in the presence of Ziegler-Natta catalysts. Typically, the melt flow rate of such polypropylenes is in the range of 4.0 to about 20.0 g/10 min. In order to achieve melt flow rates within said range, the polymerization conditions in the reactor can be adapted accordingly by adjusting the amount of hydrogen fed into the reactor. According to this approach, however, a lot of waste material is produced when the melt flow rate range is changed during the process.

Another way is to use controlled rheology technology (visbreaking), meaning that radical initiators are introduced in the compounding step and the final melt flow rate is reached by cutting the chain from an original low melt flow rate grade. Typically, the initiators are peroxides. They decompose into radicals at higher temperatures, which starts the chain scission of polypropylene during the processing. This from one side reduces the complexity and the waste production, however, from another side it is known that oligomers will be created, which may cause troubles for some applications. For example, sterilization behavior will be worse, meaning haze is higher after sterilization, or a higher amount of leachables is found.

Accordingly, there is a need in the art for a propylene copolymer which is applicable as a sealing layer for a multi-layer film and, at the same time, can be sterilized without impairing the optical properties.

Apart from the optical properties, it is also required that the sealing properties of polypropylene films used for packaging applications are on a high level. For the sealing process, it is crucial that the films have a broad sealing window, i.e. the temperature window within the sealing may occur should be as broad as possible. Further, the article to be sealed should not be exposed to high temperatures whereupon a low sealing initiation temperature (SIT) is preferred. Further, a high hot tack strength is required to ensure the formation of a strong seal. EP 2 386 603 A1 describes cast films prepared from copolymers of propylene and higher α-olefins showing a broad sealing window at a low sealing initiation temperature (SIT). Copolymers of propylene and 1-hexene showing improved hot tack properties accompanied by a good sealing window are also disclosed by WO 2011/131639 A1. However, the optical properties are not satisfying.

Therefore, it is an object of the present invention to provide a copolymer of propylene having a low haze before and after sterilization while the sealing and mechanical properties remain on a high level.

Hence, the present invention is directed to a polypropylene composition (P), comprising at least 90.0 wt.-%, based on the overall weight of the polypropylene composition (P), of a copolymer (C) of propylene and 1-hexene, having i) an overall 1-hexene content in the range of 2.0 to 10.0 wt.-%, ii) a melt flow rate MFR$_2$ determined according to ISO 1133 (2.16 kg, 230° C.) in the range of 4.0 to 20.0 g/10 min, and iii) an amount of 2,1 erythro regio-defects of at least 0.2 mol.-%.

In a preferred embodiment, the present invention is directed to polypropylene composition (P), comprising at least 90.0 wt.-%, based on the overall weight of the polypropylene composition (P), of a copolymer (C) of propylene and 1-hexene, having i) an overall 1-hexene content in the range of 2.0 to 10.0 wt.-%, ii) a melt flow rate MFR$_2$ determined according to ISO 1133 (2.16 kg, 230° C.) in the range of 4.0 to 20.0 g/10 min, and iii) an amount of 2,1 erythro regio-defects of at least 0.2 mol.-%, wherein the copolymer (C) has been visbroken with a visbreaking ratio (VR) in the range of 1.5 to 15.0, wherein the visbreaking is determined according to equation (2)

$$VR = \frac{MFR_{final}}{MFR_{start}} \quad (2)$$

wherein "MFR$_{final}$" is the melt flow rate MFR$_2$ determined according to ISO 1133 (230° C., 2.16 kg) of the copolymer (C) after visbreaking and "MFR$_{start}$" is the melt flow rate MFR$_2$ determined according to ISO 1133 (230° C., 2.16 kg) of the copolymer (C) before visbreaking.

According to one embodiment of the present invention, the copolymer (C) has a xylene soluble content (XCS) of at least 8.0 wt.-%.

According to another embodiment of the present invention, the copolymer (C) comprises a) a first random propylene copolymer (A) of propylene and a 1-hexene having a comonomer content in the range of 0.1 to 4.0 wt.-%, and b) a second random propylene copolymer (B) of propylene and 1-hexene having a higher comonomer content than the first random propylene copolymer (A).

According to a further embodiment of the present invention, the copolymer (C) has a 1-hexene content of the xylene soluble fraction C6(XCS) in the range of 2.0 to 15.0 wt.-%.

According to another embodiment of the present invention, the copolymer (C) comprises 30.0 to 70.0 wt.-% of the first random propylene copolymer (A) and 30.0 to 70.0 wt.-% of the second random propylene copolymer (B), based on the overall weight of the copolymer (C).

According to one embodiment of the present invention, the copolymer (C) has a melting temperature Tm below 140° C.

According to a further embodiment of the present invention, the copolymer (C) fulfills in-equation (1)

$$4.50 \leq \frac{C6(C)}{C6(A) * \frac{[A]}{[C]}} \leq 9.00 \quad (1)$$

wherein

C6(A) is the 1-hexene content of the first random propylene copolymer (A) based on the total weight of the first random propylene copolymer (A) [in wt.-%];

C6(C) is the 1-hexene content of the copolymer (C) based on the total weight of the copolymer (C) [in wt.-%]; and

[A]/[C] is the weight ratio between the first random propylene copolymer (A) and the copolymer (C) [in g/g].

According to another embodiment of the present invention, the copolymer (C) has been visbroken with a visbreaking ratio (VR) in the range of 1.5 to 15.0, wherein the visbreaking is determined according to equation (2)

$$VR = \frac{MFR_{final}}{MFR_{start}} \quad (2)$$

wherein "$MFR_{final}$" is the melt flow rate $MFR_2$ determined according to ISO 1133 (230° C., 2.16 kg) of the copolymer (C) after visbreaking and "$MFR_{start}$" is the melt flow rate $MFR_2$ determined according to ISO 1133 (230° C., 2.16 kg) of the copolymer (C) before visbreaking.

According to one embodiment of the present invention, the copolymer (C) has a melt flow rate $MFR_2$ determined according to ISO 1133 (230° C., 2.16 kg) before visbreaking in the range of 0.4 to below 4.0 g/10 min.

According to a further embodiment of the present invention, the first random propylene copolymer (A) has a melt flow rate $MFR_2$ (230° C., 2.16 kg) determined according to ISO 1133 before visbreaking in the range of 0.3 to 6.0 g/10 min, and/or the second random propylene copolymer (B) has a melt flow rate $MFR_2$ (230° C., 2.16 kg) determined according to ISO 1133 before visbreaking in the range of 0.1 to 4.0 g/10 min.

The present invention is further directed to a process for the preparation of a copolymer (C) of propylene and 1-hexene, comprising the steps of a) preparing a copolymer (C') of propylene and 1-hexene having an overall 1-hexene content in the range of 2.0 to 10.0 wt.-% in the presence of a metallocene catalyst (MC), b) visbreaking the copolymer (C') obtained in step a) with a visbreaking ratio (VR) in the range of 1.5 to 15.0, thereby obtaining the copolymer (C), wherein the visbreaking is determined according to equation (3)

$$VR = \frac{MFR(C)}{MFR(C')} \quad (3)$$

wherein "MFR(C)" is the melt flow rate $MFR_2$ determined according to ISO 1133 (230° C., 2.16 kg) of the copolymer (C) after visbreaking and "MFR(C')" is the melt flow rate $MFR_2$ determined according to ISO 1133 (230° C., 2.16 kg) of the copolymer (C').

According to one embodiment of the present invention, the copolymer (C') of propylene and 1-hexene is prepared by a1) polymerizing propylene and 1-hexene in a first reactor (R-1) in the presence of the metallocene catalyst (MC), thereby obtaining a first random propylene copolymer (A) having a 1-hexene content in the range of 0.1 to 4.0 wt.-%, a2) transferring said first random propylene copolymer (A) and unreacted comonomers of the first reactor (R-1) in a second reactor (R-2), and a3) polymerizing in said second reactor (R-2) and in the presence of said first random propylene copolymer (A) propylene and 1-hexene obtaining a second random propylene copolymer (B) having a higher comonomer content than the first random propylene copolymer (A), said first random propylene copolymer (A) and said second random propylene copolymer (B) forming the copolymer (C').

According to another embodiment of the present invention, the melt flow rate $MFR_2$ determined according to ISO 1133 (230° C., 2.16 kg) of the copolymer (C) is in the range of 4.0 to 20.0 g/10 min and the melt flow rate $MFR_2$ determined according to ISO 1133 (230° C., 2.16 kg) of the copolymer (C') is in the range of 0.4 to below 4.0 g/10 min.

According to a further embodiment of the present invention, the metallocene catalyst (MC) is of formula of formula (I)

$$R_n(Cp)_2MX_2 \quad (I)$$

wherein each Cp independently is an unsubstituted or substituted and/or fused cyclopentadienyl ligand, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"₃, —OSiR"₃, —SR", —PR"₂, OR" or —NR"₂, each R" is independently a hydrogen or hydrocarbyl selected from C1-C20-alkyl, C2-C20-alkenyl, C2-C20-alkynyl, C3-C12-cycloalkyl or C6-C20-aryl; or in case of —NR"₂, the two substituents R" can form a five- or six-membered ring, together with the nitrogen atom to which they are attached;

R is a bridge of 1-2 C-atoms and 0-2 heteroatoms, wherein the heteroatom(s) can be Si, Ge and/or O atom(s), wherein each of the bridge atoms may bear independently substituents selected from C1-C20-alkyl, tri(C1-C20-alkyl)silyl, tri(C1-C20-alkyl)siloxy or C6-C20-aryl substituents); or a bridge of one or two heteroatoms selected from silicon, germanium and/or oxygen atom(s), M is a transition metal of Group 4 selected from Zr or Hf, especially Zr;

each X is independently a sigma-ligand selected from H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"₃, —SiR"₃, —OSiR"₃, —NR"₂ or —CH₂—Y, wherein Y is C6-C20-aryl, C6-C20-heteroaryl, C1-C20-alkoxy, C6-C20-aryloxy, NR"₂, —SR", —PR"₃, —SiR"₃, or —OSiR"₃;

each of the above mentioned ring moieties alone or as a part of another moiety as the substituent for Cp, X, R" or R can further be substituted with C1-C20-alkyl which may contain Si and/or O atoms; and n is 1 or 2.

It is especially preferred that the metallocene catalyst (MC) of formula (I) is an organo-zirconium compound of formula (II) or (II')

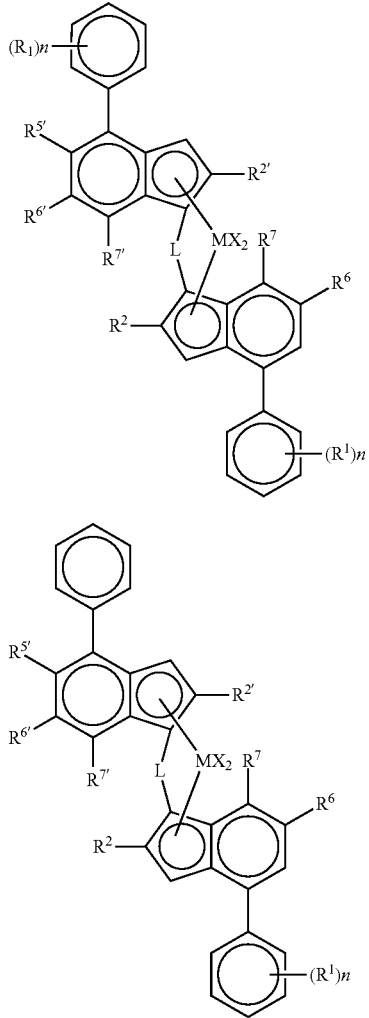

wherein
M is Zr;
each X is a sigma ligand, preferably each X is independently a hydrogen atom, a halogen atom, a C1-C6 alkoxy group, C1-C6 alkyl, phenyl or a benzyl group;
L is a divalent bridge selected from —R'$_2$C—, —R'$_2$C—CR'$_2$, —R'$_2$Si—, —R'$_2$Si—SiR'$_2$—, —R'$_2$Ge—, wherein each R' is independently a hydrogen atom, C1-C20 alkyl, C3-C10 cycloalkyl, tri(C1-C20-alkyl) silyl, C6-C20-aryl or C7-C20 arylalkyl;
each $R^2$ or $R^{2'}$ is a C1-C10 alkyl group;
$R^{5'}$ is a C1-C10 alkyl group or a $Z'R^{3'}$ group;
$R^6$ is hydrogen or a C1-C10 alkyl group;
$R^{6'}$ is a C1-C10 alkyl group or a C6-C10 aryl group;
$R^7$ is hydrogen, a C1-C6 alkyl group or a $ZR^3$ group;
$R^{7'}$ is hydrogen or a C1-C10 alkyl group;
Z and Z' are independently O or S;
$R^{3'}$ is a C1-C10 alkyl group, or a C6-C10 aryl group optionally substituted by one or more halogen groups;
$R^3$ is a C1-C10 alkyl group;
each n is independently 0 to 4;
and each $R^1$ is independently a C1-C20 hydrocarbyl group.

The present invention is also directed to a polypropylene composition (P), comprising at least 90 wt.-% of the copolymer (C) obtained according to the process described above.

The present invention is further directed to an article, comprising at least 90.0 wt.-% of the polypropylene composition (P) as described above.

It is especially preferred that said article is a film, more preferably a cast film.

The present invention is also directed to the use of the above described article as a sealing layer in a multi-layer film.

In the following, the polypropylene composition (P) is described in more detail.

The polypropylene composition (P) according to the present invention comprises at least 90.0 wt.-%, based on the overall weight of the polypropylene composition (P), of the copolymer (C) of propylene and 1-hexene.

Preferably, the polypropylene composition (P) comprises at least 95.0 wt.-% of the copolymer (C), more preferably at least 97.0 wt.-%, still more preferably at least 98.0 wt.-%, like at least 99.0 wt.-%, based on the overall weight of the polypropylene composition (P). It is especially preferred that the polypropylene composition (P) consists of the copolymer (C).

The copolymer (C) according to this invention is featured by a rather high comonomer content, i.e. 1-hexene content. The rather high comonomer content is achieved due to the fact that the inventive copolymer (C) comprises two fractions of propylene copolymer as defined herein. A "comonomer" according to this invention is a polymerizable unit different to propylene. Accordingly the copolymer (C) according to this invention shall have a 1-hexene content in the range of 2.0 to 10.0 wt.-%, more preferably in the range of 3.0 to 8.0 wt.-%, still more preferably in the range of 4.0 to 7.0 wt.-%, like in the range of 4.8 to 6.5 wt.-%.

Furthermore, it is preferred that the copolymer (C) of the present invention has a melt flow rate (MFR) given in a specific range. The melt flow rate measured under a load of 2.16 kg at 230° C. (ISO 1133) is denoted as $MFR_2$ (230° C., 2.16 kg). Accordingly, in the present invention the copolymer (C) has a melt flow rate $MFR_2$ (230° C., 2.16 kg) determined according to ISO 1133 in the range of 4.0 to 20.0 g/10 min, preferably in the range of 5.0 to 15.0 g/10 min, more preferably in the range of 6.0 to 12.0 g/10 min, still more preferably in the range of 7.0 to 11.0 g/10 min.

As mentioned above, the polypropylene composition (P) shall be especially suitable for the packaging industry. Accordingly good sealing properties are desired, like rather low heat sealing initiation temperature (SIT) and a broad sealing window combined with low stickiness.

Accordingly it is preferred that the polypropylene composition (P) has a heat sealing initiation temperature (SIT) of equal or below 117° C., more preferably of equal or below 113° C., still more preferably in the range of 93 to equal or below 113° C., yet more preferably in the range of 93 to equal or below 110° C.

Furthermore, not only shall the heat sealing initiation temperature (SIT) be rather low, but also the melting temperature (Tm) shall be rather high. Accordingly the difference between the melting temperature (Tm) and the heat sealing initiation temperature (SIT) shall be rather high. Thus it is preferred that the polypropylene composition (P)

fulfills the equation (3), more preferably the equation (3a), yet more preferably the equation (3b)

$$Tm-\text{SIT}>20°\ C. \quad (3)$$

$$Tm-\text{SIT}>25°\ C. \quad (3a)$$

$$Tm-\text{SIT}>30°\ C. \quad (3b)$$

wherein

Tm is the melting temperature given in centigrade [° C.] of the polypropylene composition (P), SIT is the heat sealing initiation temperature (SIT) given in centigrade [° C.] of the polypropylene composition (P).

The melting temperature (Tm) measured according to ISO 11357-3 of the copolymer (C) is preferably below 140° C. Thus it is in particular appreciated that the melting temperature (Tm) measured according to ISO 11357-3 of the copolymer (C) is in the range of 125 to below 140° C., more preferably in the range of 125 to below 140° C., still more preferably in the range of 128° C. to 139° C.

Additionally the copolymer (C) can be defined by the xylene cold soluble (XCS) content measured according to ISO 16152 (25° C.). Accordingly the copolymer (C) is preferably featured by a xylene cold soluble (XCS) content of at least 8.0 wt.-%, more preferably in the range of 8.0 to 20.0 wt.-%, still more preferably in the range of 9.0 to 18.0 wt.-%, like in the range of 9.0 to 15.0 wt.-%.

The amount of xylene cold soluble (XCS) additionally indicates that the copolymer (C) is preferably free of any elastomeric polymer component, like an ethylene propylene rubber. In other words the copolymer (C) shall be not a heterophasic polypropylene, i.e. a system consisting of a polypropylene matrix in which an elastomeric phase is dispersed. Such systems are featured by a rather high xylene cold soluble content. Accordingly in a preferred embodiment the copolymer (C) comprises the first random propylene copolymer (A) and the second random propylene copolymer (B) as the only polymer components.

Further, it is preferred that the copolymer (C) has a 1-hexene content of the xylene soluble fraction C6(XCS) in the range of 2.0 to 15.0 wt.-%, more preferably in the range of 3.5 to 12.0 wt.-%, still more preferably in the range of 4.0 to 10.0 wt.-%, like in the range of 5.0 to 8.0 wt.-%.

Similar to xylene cold solubles (XCS) the hexane hot soluble (HHS) indicate that part of a polymer which has a low isotacticity and crystallinity and which is soluble in hexane at 50° C.

Accordingly it is preferred that the inventive copolymer (C) has an amount of hexane hot solubles (HHS) measured according to FDA 177.1520 equal or below 1.5 wt.-%, more preferably equal or below 1.0 wt.-%, still more preferably equal or below 0.8 wt.-%.

The copolymer (C) has an amount of 2,1 erythro regio-defects of at least 0.2 mol.-%, preferably at least 0.3 mol-%, still more preferably at least 0.4 mol-%. Without being bound to theory, a high amount of misinsertions of propylene and/or 1-hexene within the polymer chain indicates that the copolymer (C) is produced in the presence of a single site catalyst, preferably a metallocene catalyst.

According to a preferred embodiment of the present invention, the copolymer (C) has been visbroken.

The visbroken copolymer (C) has a higher melt flow rate than the non-visbroken copolymer (C).

Accordingly, the copolymer (C) preferably has a melt flow rate MFR₂ (230° C., 2.16 kg) determined according to ISO 1133 before visbreaking in the range of 0.4 to below 4.0 g/10 min, more preferably in the range of 0.6 to 3.5 g/10 min, still more preferably in the range of 0.8 to 3.0 g/10 min, like in the range of 1.3 to 2.0 g/10 min.

In one embodiment of the present invention, the copolymer (C) has been visbroken with a visbreaking ratio (VR) in the range of 1.5 to 15.0, wherein the visbreaking is determined according to equation (2)

$$VR = \frac{MFR_{final}}{MFR_{start}} \quad (2)$$

wherein "$MFR_{final}$" is the melt flow rate $MFR_2$ determined according to ISO 1133 (230° C., 2.16 kg) of the copolymer (C) after visbreaking and "$MFR_{start}$" is the melt flow rate $MFR_2$ determined according to ISO 1133 (230° C., 2.16 kg) of the copolymer (C) before visbreaking. More preferably, said visbreaking ratio (VR) is in the range of 2.0 to 12.0, like in the range of 3.0 to 10.0.

Preferred mixing devices suited for visbreaking are discontinuous and continuous kneaders, twin screw extruders and single screw extruders with special mixing sections and co-kneaders.

By visbreaking the copolymer (C) with heat or at more controlled conditions in the presence of visbreaking agents such as peroxides, the molar mass distribution (MWD) becomes narrower because the long molecular chains are more easily broken up or scissored and the molar mass M will decrease, corresponding to an MFR₂ increase. The MFR₂ increases with increase in the amount of the visbreaking agent which is used.

Unless indicated otherwise, the melt flow rates mentioned herein are melt flow rates after visbreaking.

Such visbreaking may be carried out in any known manner, like by using a peroxide visbreaking agent. Typical visbreaking agents are 2,5-dimethyl-2,5-bis(tert.-butyl-peroxy)hexane (DHBP) (for instance sold under the tradenames Luperox 101 and Trigonox 101), 2,5-dimethyl-2,5-bis(tert.-butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.-butyl-peroxide (DTBP) (for instance sold under the tradenames Trigonox B and Luperox Di), tert.-butyl-cumyl-peroxide (BCUP) (for instance sold under the tradenames Trigonox T and Luperox 801) and bis (tert.-butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of copolymer (C) to be subjected to visbreaking, the MFR₂ (230° C./2.16 kg) value of copolymer (C) to be subjected to visbreaking and the desired target MFR₂ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of copolymer (C) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The copolymer (C) of the present invention is further defined by its polymer fractions present. According to a preferred embodiment of the present invention, the copolymer (C) is at least bimodal. Accordingly the copolymer (C) of the present invention preferably comprises at least, more preferably consists of, two fractions, namely a first random propylene copolymer (A) and a second random propylene copolymer (B).

The copolymer (C) comprises a first random propylene copolymer (A) and a second random propylene copolymer (B). The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH]<[H]^2$$

wherein
[HH] is the molar fraction of adjacent comonomer units, like of adjacent 1-hexene units, and
[H] is the molar fraction of total comonomer units, like of total 1-hexene units, in the polymer.

The first random propylene copolymer (A) is a copolymer of propylene and a 1-hexene having an 1-hexene content in the range of 0.1 to 4.0 wt.-%, preferably in the range of 0.5 to 3.5 wt.-%, more preferably in the range of 0.8 to 3.0 wt.-%, still more preferably in the range of 1.0 to 2.5 wt.-%, and the second random propylene copolymer (B) is a copolymer of propylene and 1-hexene having a higher 1-hexene content than the first random copolymer (A), preferably in the range of 4.0 to 20.0 wt.-%, more preferably in the range of 5.0 to 15.0 wt.-%, still more preferably in the range of 6.0 to 12.0 wt.-%, yet more preferably in the range of 6.5 to 10.0 wt.-%.

Accordingly, the first random propylene copolymer (A) is the 1-hexene lean fraction whereas the second random propylene copolymer (B) is the 1-hexene rich fraction.

Further, it is appreciated that the first random propylene copolymer (A) has a melt flow rate $MFR_2$ (230° C., 2.16 kg) determined according to ISO 1133 before visbreaking in the range of 0.3 to 6.0 g/10 min, more preferably in the range of 0.5 to 5.0 g/10 min, still more preferably in the range of 0.8 to 3.0 g/10 min.

The second propylene copolymer (B) preferably has a has a melt flow rate $MFR_2$ (230° C., 2.16 kg) determined according to ISO 1133 before visbreaking in the range of 0.1 to 4.0 g/10 min, more preferably in the range of 0.3 to 3.5 g/10 min, still more preferably in the range of 0.6 to 2.5 g/10 min, like in the range of 0.9 to 2.0 g/10 min.

Preferably the weight ratio between the first random propylene copolymer (A) and the second random propylene copolymer (B) within the copolymer (C) is in the range of 30:70 to 70:30, more preferably in the range of 35:65 to 65:35, still more preferably in the range of 40:60 to 60:40.

In particular, it is preferred that the copolymer (C) comprises 30.0 to 70.0 wt.-%, more preferably 35.0 to 50.0 wt.-%, still more preferably 38.0 to 45.0 wt.-%, like 39.0 wt.-% to 43.0 wt.-% of the first random propylene copolymer (A) and 30.0 to 70.0 wt.-%, more preferably 40.0 to 65.0 wt.-%, still more preferably 48.0 to 60.0 wt.-%, like 52.0 to 55.0 wt.-% of the second random propylene copolymer (B), based on the overall weight of the copolymer (C).

Further, the copolymer (C) may contain additives (AD). Accordingly, it is preferred that the copolymer (C) comprises, more preferably consists of, 20.0 to 55.0 wt.-%, more preferably 35.0 to 50.0 wt.-%, still more preferably 38.0 to 45.0 wt.-%, like 40.0 wt.-% to 43.0 wt.-% of the first random propylene copolymer (A) and 45.0 to 80.0 wt.-%, more preferably 50.0 to 65.0 wt.-%, still more preferably 55.0 to 62.0 wt.-%, like 57.0 to 60.0 wt.-% of the second random propylene copolymer (B) and 0.01 to 5.0 wt.-%, more preferably 0.03 to 3.0 wt.-%, still more preferably 0.06 to 2.0 wt.-%, like 0.08 to 1.0 wt.-% of additives (AD), based on the overall weight of the copolymer (C).

Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", 6' edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the copolymer (C) of the invention does not comprise (a) further polymer (s) different to the first random propylene copolymer (A) and the second random propylene copolymer (B) in an amount exceeding 15 wt.-%, preferably in an amount exceeding 10 wt.-%, more preferably in an amount exceeding 9 wt.-%, based on the weight of the copolymer (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the copolymer (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof. It is especially preferred that the polymeric carrier material is polypropylene.

The copolymer (C) is obtained by a process as defined in detail below.

The process for the preparation of the copolymer (C) of propylene and 1-hexene comprises the steps of
a) preparing a copolymer (C') of propylene and 1-hexene having an overall 1-hexene content in the range of 2.0 to 10.0 wt.-% in the presence of a metallocene catalyst (MC),
b) visbreaking the copolymer (C') obtained in step a) with a visbreaking ratio (VR) in the range of 1.5 to 15.0, thereby obtaining the copolymer (C), wherein the visbreaking is determined according to equation (3)

$$VR = \frac{MFR(C)}{MFR(C')} \qquad (3)$$

wherein "MFR(C)" is the melt flow rate $MFR_2$ determined according to ISO 1133 (230° C., 2.16 kg) of the copolymer (C) after visbreaking and
"MFR(C')" is the melt flow rate $MFR_2$ determined according to ISO 1133 (230° C., 2.16 kg) of the copolymer (C').

The copolymer (C') according to step a) corresponds to the copolymer (C) before visbreaking. As outlined above, the molecular weight of a propylene copolymer decreases during the visbreaking process whereby the melt flow rate increases. However, without being bound to theory, the comonomer content, the tacticity and the amount of xylene cold solubles of a propylene copolymer are not affected by the visbreaking process. Therefore, the above ranges for the 1-hexene content, xylene cold soluble content (XCS) and amount of hexane hot solubles (HHS) of the copolymer (C) apply accordingly for the copolymer (C').

Therefore, the copolymer (C') has a 1-hexene content in the range of 2.0 to 10.0 wt.-%, preferably in the range of 3.0 to 8.0 wt.-%, like in the range of 4.0 to 7.0 wt.-%.

Additionally the copolymer (C') can be defined by the xylene cold soluble (XCS) content measured according to ISO 16152 (25° C.). Accordingly the copolymer (C') is preferably featured by a xylene cold soluble (XCS) content of at least 8.0 wt.-%, more preferably in the range of 8.0 to 20.0 wt.-%, still more preferably in the range of 9.0 to 18.0 wt.-%, like in the range of 9.0 to 15.0 wt.-%.

Further, it is preferred that the inventive copolymer (C') has an amount of hexane hot solubles (HHS) measured according to FDA 177.1520 equal or below 1.5 wt.-%, more preferably equal or below 1.0 wt.-%, still more preferably equal or below 0.8 wt.-%.

The copolymer (C') preferably has a melt flow rate $MFR_2$ (230° C., 2.16 kg) determined according to ISO 1133 in the range of 0.4 to below 4.0 g/10 min, more preferably in the range of 0.6 to 3.5 g/10 min, still more preferably in the range of 0.8 to 3.0 g/10 min, like in the range of 1.0 to 2.0 g/10 min.

The copolymer (C') of the present invention is further defined by its polymer fractions present. According to a preferred embodiment of the present invention, the copolymer (C') is at least bimodal. Accordingly the copolymer (C') of the present invention preferably comprises at least, more preferably consists of, two fractions, namely a first random propylene copolymer (A) and a second random propylene copolymer (B).

Accordingly, the copolymer (C') according to step a) of the inventive process is preferably obtained by
a1) polymerizing propylene and 1-hexene in a first reactor (R-1) in the presence of the metallocene catalyst (MC), thereby obtaining a first random propylene copolymer (A) having a 1-hexene content in the range of 0.1 to 4.0 wt.-%,
a2) transferring said first random propylene copolymer (A) and unreacted comonomers of the first reactor (R-1) in a second reactor (R-2), and
a3) polymerizing in said second reactor (R-2) and in the presence of said first random propylene copolymer (A) propylene and 1-hexene obtaining a second random propylene copolymer (B) having a higher 1-hexene content than the first random copolymer (A), said first random propylene copolymer (A) and said second random propylene copolymer (B) forming the copolymer (C').

The first random propylene copolymer (A) is a copolymer of propylene and a 1-hexene preferably having a 1-hexene content in the range of 0.1 to 4.0 wt.-%, more preferably in the range of 0.5 to 3.5 wt.-%, still more preferably in the range of 0.8 to 3.0 wt.-%, yet more preferably in the range of 1.0 to 2.5 wt.-%, and the second random propylene copolymer (B) is a copolymer of propylene and 1-hexene having a higher 1-hexene content than the first random copolymer (A), preferably in the range of 4.0 to 20.0 wt.-%, more preferably in the range of 5.0 to 15.0 wt.-%, still more preferably in the range of 6.0 to 12.0 wt.-%, yet more preferably in the range of 6.5 to 10.0 wt.-%.

Accordingly, it is preferred that the first random propylene copolymer (A) is the 1-hexene lean fraction whereas the second random propylene copolymer (B) is the 1-hexene rich fraction. In other words, the second random propylene copolymer (B) preferably has a higher comonomer content than the propylene copolymer (A).

Further, it is appreciated that the first random propylene copolymer (A) has a melt flow rate $MFR_2$ (230° C., 2.16 kg) determined according to ISO 1133 before visbreaking in the range of 0.3 to 6.0 g/10 min, more preferably in the range of 0.5 to 5.0 g/10 min, still more preferably in the range of 0.8 to 3.0 g/10 min.

The second propylene copolymer (B) preferably has a has a melt flow rate $MFR_2$ (230° C., 2.16 kg) determined according to ISO 1133 before visbreaking in the range of 0.1 to 4.0 g/10 min, more preferably in the range of 0.3 to 3.5 g/10 min, still more preferably in the range of 0.6 to 2.5 g/10 min, like in the range of 0.9 to 1.3 g/10 min.

In step b) of the inventive process, the copolymer (C') is visbroken in order to obtain the copolymer (C). Regarding the preferred method for visbreaking, reference is made to the definitions provided above.

The copolymer (C') is visbroken with a visbreaking ratio (VR) in the range of 1.5 to 15.0, thereby obtaining the copolymer (C), wherein the visbreaking is determined according to equation (3)

$$VR = \frac{MFR(C)}{MFR(C')} \quad (3)$$

wherein "MFR(C)" is the melt flow rate $MFR_2$ determined according to ISO 1133 (230° C., 2.16 kg) of the copolymer (C) after visbreaking and "MFR(C')" is the melt flow rate $MFR_2$ determined according to ISO 1133 (230° C., 2.16 kg) of the copolymer (C'). More preferably, said visbreaking ratio (VR) is in the range of 2.0 to 12.0, like in the range of 3.0 to 10.0.

Preferably, the melt flow rate $MFR_2$ determined according to ISO 1133 (230° C., 2.16 kg) of the copolymer (C), i.e. the melt flow rate $MFR_2$ after visbreaking, is in the range of 4.0 to 20.0 g/10 min, more preferably in the range of 5.0 to 15.0 g/10 min, still more preferably in the range of 6.0 to 12.0 g/10 min, yet more preferably in the range of 7.0 to 11.0 g/10 min, and the melt flow rate $MFR_2$ determined according to ISO 1133 (230° C., 2.16 kg) of the copolymer (C'), i.e. the melt flow rate $MFR_2$ before visbreaking, is in the range of 0.4 to below 4.0 g/10 min, more preferably in the range of 0.6 to 3.5 g/10 min, still more preferably in the range of 0.8 to 3.0 g/10 min, like in the range of 1.0 to 2.5 g/10 min.

Further, it is preferred that the metallocene catalyst (MC) is a transition metal compound of formula (I) as defined in more detail below.

The process for the preparation of a copolymer (C) forming the polypropylene composition (P) as defined above is a sequential polymerization process comprising at least two reactors connected in series, wherein said process comprises the steps of
(A) polymerizing in a first reactor (R-1) being a slurry reactor (SR), preferably a loop reactor (LR), propylene and 1-hexene, obtaining a first random propylene copolymer (A), (B) transferring said first random propylene copolymer (A) and unreacted comonomers of the first reactor (R-1) in a second reactor (R-2) being a gas phase reactor (GPR-1),
(C) feeding to said second reactor (R-2) propylene and 1-hexene,
(D) polymerizing in said second reactor (R-2) and in the presence of said first random propylene copolymer (A) propylene and 1-hexene obtaining a second random propylene copolymer (B), thereby obtaining a composition (C') comprising the first random propylene copolymer (A) and the second random propylene copolymer (B), and
(E) extruding the composition (C') comprising the first random propylene copolymer (A) and the second random propylene copolymer (B) obtained in step (D) in the presence of a visbreaking agent, preferably a peroxide, thereby obtaining the copolymer (C) of the polypropylene composition (P),
wherein further
in the first reactor (R-1) and second reactor (R-2) the polymerization takes place in the presence of metallocene catalyst (MC) comprising
(i) a transition metal compound of formula (I)

$$R_n(Cp)_2MX_2 \qquad (I)$$

wherein
"M" is zirconium (Zr) or hafnium (Hf),
each "X" is independently a monovalent anionic σ-ligand,
each "Cp" is a cyclopentadienyl-type organic ligand independently selected from the group consisting of unsubstituted or substituted and/or fused cyclopentadienyl, substituted or unsubstituted indenyl or substituted or unsubstituted fluorenyl, said organic ligands coordinate to the transition metal (M),
"R" is a bivalent bridging group linking said organic ligands (Cp),
"n" is 1 or 2, preferably 1, and
(ii) optionally a cocatalyst (Co) comprising an element (E) of group 13 of the periodic table (IUPAC), preferably a cocatalyst (Co) comprising a compound of Al and/or B.

Concerning the definition of the Copolymer (C), the first random propylene copolymer (A) and the second random propylene copolymer (B) it is referred to the definitions given above.

The metallocene catalyst (MC) is defined in more detail below.

Due to the use of the metallocene catalyst (MC) in a sequential polymerization process the manufacture of the above defined copolymer (C) is possible. In particular due to the preparation of a propylene copolymer, i.e. the first random propylene copolymer (A), in the first reactor (R-1) and the conveyance of said propylene copolymer and especially the conveyance of unreacted comonomers into the second reactor (R-2) it is possible to produce a copolymer (C) with high comonomer content in a sequential polymerization process. Normally the preparation of a propylene copolymer with high comonomer content in a sequential polymerization process leads to fouling or in severe cases to the blocking of the transfer lines as normally unreacted comonomers condensate at the transfer lines. However with the new method the conversion of the comonomers is increased and therewith a better incorporation into the polymer chain leading to higher comonomer content and reduced stickiness problems.

The term "sequential polymerization process" indicates that the copolymer (C) is produced in at least two reactors connected in series. More precisely the "term sequential polymerization process" indicates in the present application that the polymer of the first reactor (R-1) is directly conveyed with unreacted comonomers to the second reactor (R-2). Accordingly decisive aspect of the present process is the preparation of the copolymer (C) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two the polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be can be any continuous or simple stirred batch tank reactor or loop reactor operating in slurry. According to the present invention the slurry reactor (SR) is preferably a loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing the copolymer (C) as defined above the conditions for the first reactor (R-1), i.e. the slurry reactor (SR), like a loop reactor (LR), of step (A) may be as follows:
the temperature is within the range of 40° C. to 110° C., preferably between 60° C. and 100° C., more preferably in the range of 65 to 90° C.,
the pressure is within the range of 20 bar to 80 bar, preferably between 40 bar to 70 bar,
hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:
the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for producing the copolymer (C) the residence time in the slurry reactor (SR), e.g. loop (LR) is in the range 0.2 to 4 hours, e.g. 0.3 to 1.5 hours and the residence time in gas phase reactor (GPR) will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

The copolymer (C) according to the present invention is preferably prepared in the presence of a metallocene catalyst (MC) comprising a transition metal compound.

In a preferred embodiment the transition metal compound has the formula (I)

$$R_n(Cp)_2MX_2 \tag{I}$$

wherein
each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"$_2$, the two substituents R" can form a ring, e.g. five- or six-membered ring, together with the nitrogen atom to which they are attached;

R is a bridge of 1-3 atoms, e.g. a bridge of 1-2 C-atoms and 0-2 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^{10}_2$, wherein each R$^{10}$ is independently C1-C20-alkyl, C3-12 cycloalkyl, C6-C20-aryl or tri(C1-C20-alkyl) silyl-residue, such as trimethylsilyl;

M is a transition metal of Group 4, e.g. Zr or Hf, especially Zr;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R can further be substituted e.g. with C1-C20-alkyl which may contain Si and/or O atoms;

n is 1 or 2.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, each X is halogen, methyl, phenyl or —CH$_2$—Y, and each Y is independently as defined above.

Cp is preferably cyclopentadienyl, indenyl, or fluorenyl, optionally substituted as defined above. Ideally Cp is cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, is preferably a methylene, ethylene or a silyl bridge, whereby the silyl can be substituted as defined above, e.g. a (dimethyl)Si=, (methylphenyl)Si=, (methylcyclohexyl)silyl= or (trimethylsilylmethyl)Si=; n is 0 or 1. Preferably, R" is other than hydrogen.

A specific subgroup includes the well known metallocenes of Zr and Hf with two eta5-ligands which are bridged with cyclopentadienyl ligands optionally-substituted with e.g. siloxy, or alkyl (e.g. C1-6-alkyl) as defined above, or with two bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-985683 1 and WO-A-0034341. For the preparation see also e.g. in EP-A-260 130. WO-A-9728170, WO-A-9846616, WO-A-9849208, WO-A-9912981, WO-A-9919335, WO-A-9856831, WO-A-00 34341, EP-A-423 101 and EP-A-537 130.

The complexes of the invention are preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane.

Preferred complexes of the invention are of formula (II') or (II)

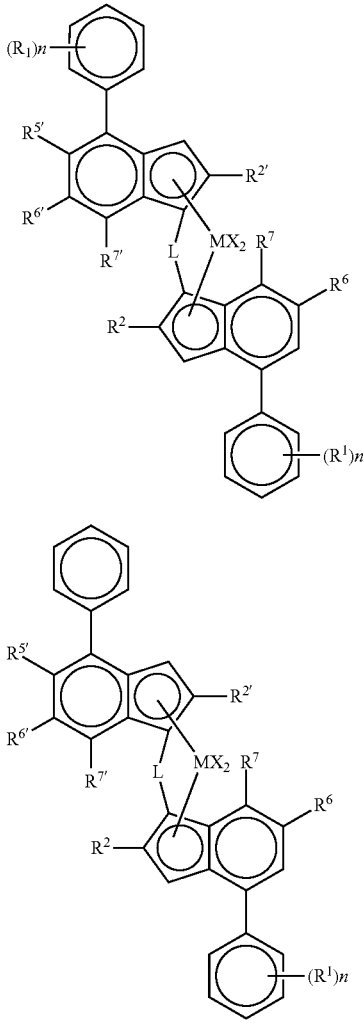

wherein
M is Zr;
each X is a sigma ligand, preferably each X is independently a hydrogen atom, a halogen atom, a C1-C6 alkoxy group, C1-C6 alkyl, phenyl or a benzyl group;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C1-C20 alkyl, C3-C10 cycloalkyl, tri(C1-C20-alkyl) silyl, C6-C20-aryl, C7-C20 arylalkyl
each $R^2$ or $R^{2'}$ is a C1-C10 alkyl group;
$R^{5'}$ is a C1-C10 alkyl group or a $Z'R^{3'}$ group;
$R^6$ is hydrogen or a C1-C10 alkyl group;
$R^{6'}$ is a C1-C10 alkyl group or a C6-C10 aryl group;
$R^7$ is hydrogen, a C1-C6 alkyl group or a $ZR^3$ group;
$R^{7'}$ is hydrogen or a C1-C10 alkyl group;
Z and Z' are independently O or S;
$R^{3'}$ is a C1-C10 alkyl group, or a C6-C10 aryl group optionally substituted by one or more halogen groups;
$R^3$ is a C1-C10 alkyl group;
each n is independently 0 to 4, e.g. 0, 1 or 2;
and each $R^1$ is independently a C1-C20 hydrocarbyl group, e.g. a C1-C10 alkyl group.

Particularly preferred compounds of the invention include:
rac-dimethylsilanediylbis[2-methyl-4-(4-tert-butylphenyl)-1,5,6,7-tetrahydro-s-indacen-1-yl] zirconium dichloride
rac-dimethylsilanediylbis(2-methyl-4-phenyl-5-methoxy-6-tert-butylinden-1-yl) zirconium dichloride
rac-anti-Me$_2$Si(2-Me-4-Ph-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OMe-6-tBu-Ind)ZrCl$_2$
rac-anti-Me$_2$Si(2-Me-4-(3,5-di-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OC$_6$F$_5$)-6-iPr-Ind)ZrCl$_2$
rac-anti-Me(CyHex)Si(2-Me-4-Ph-6-tBu-Ind)(2-Me-4-Ph-5-OMe-6-tBu-Ind)ZrCl$_2$
rac-anti-Me$_2$Si(2-Me-4-(3,5-di-tBuPh)-7-Me-Ind)(2-Me-4-Ph-5-OMe-6-tBu-Ind)ZrCl$_2$
rac-anti-Me$_2$Si(2-Me-4-(3,5-di-tBuPh)-7-OMe-Ind)(2-Me-4-Ph-5-OMe-6-tBu-Ind)ZrCl$_2$
rac-anti-Me$_2$Si(2-Me-4-(p-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-(4-tBuPh)-5-OMe-6-tBu-Ind)ZrCl$_2$
rac-anti-Me$_2$Si(2-Me-4-(p-tBuPh)-Ind)(2-Me-4-(3,5-tBu2Ph)-5-OMe-6-tBu-Ind)ZrCl$_2$
rac-anti-Me$_2$Si(2-Me-4-(p-tBuPh)-Ind)(2-Me-4-Ph-5-OtBu-6-tBu-Ind)ZrCl$_2$.

The most preferred metallocene complex (procatalyst) is rac-anti-dimethylsilandiyl(2-methyl-4-phenyl-5-methoxy-6-tert-butyl-indenyl)(2-methyl-4-(4-tert-butylphenyl)indenyl)zirconium dichloride.

Besides the metallocene complex (procatalyst), the metallocene catalyst comprises additionally a cocatalyst as defined in WO 2015/011135 A1. Accordingly the preferred cocatalyst is methylaluminoxane (MAO) and/or a borate, preferably trityl tetrakis(pentafluorophenyl)borate.

It is especially preferred that the metallocene catalyst is unsupported, i.e. no external carrier is used. Regarding the preparation of such a metallocene complex again reference is made to WO 2015/011135 A1.

The Article

The present invention is further directed to an article comprising at least 90.0 wt.-% of the polypropylene composition (P) as defined above.

Preferably, the article comprises at least 95.0 wt.-% of the polypropylene composition (P), more preferably at least 97.0 wt.-%, still more preferably at least 98.0 wt.-%, like at least 99.9 wt.-%. It is especially preferred that the article consists of the polypropylene composition (P).

It is preferred that the article is a film, more preferably a blown film. The film according to this invention can be obtained in a conventional manner for instance by cast film technology or extrusion blown film technology. More preferably, said article is a mono-layer or multi-layer cast film. Said film has a thickness in the range of 15 to 300 µm, preferably in the range of 20 to 250 µm, more preferably in the range of 25 to 200 µm.

Preferably, the film has a haze before steam sterilization determined according to ASTM D 1003-00 measured on a 50 µm cast film below 8.0%, more preferably below 6.0%, still more preferably below 5.0%, like below 4.5%, and a haze after sterilization determined according to ASTM D 1003-00 measured on a 50 µm blown film below 8.0%, more preferably below 6.0%, still more preferably below 4.5%, like below 4.0%.

Further, it is preferred that the film has a tensile modulus determined according to ISO 527-3 on 50 μm cast film in machine direction (MD) and/or transverse direction (TD) of at least 300 MPa, more preferably in the range of 300 to 1000 MPa, still more preferably in the range of 350 to 900 MPa, like in the range of 400 to 800 MPa.

Additionally, it is preferred that the film has a high relative total penetration energy per mm thickness that a film can absorb before it breaks divided by the film thickness ($W_{tot}$), determined by the Dynatest method according to ISO 7725-2 at 23° C. on cast films of 50 m thickness. Said penetration energy ($W_{tot}$) may be at least 15.0 J/mm, preferably at least 20.0 J/mm.

It is also preferred that the film is characterized by a hot-tack force of more than 2.0 N, more preferably of more than 2.5 N.

Use

The present invention is also directed to the use of the article, preferably the film according to the present invention comprising the polypropylene composition (P) as a sealing layer in a multi-layer film.

Such multi-layer films are usually prepared by means of cast film co-extrusion. The extrusion coating process may be carried out using conventional cast film co-extrusion techniques. Hence, the polypropylene composition (P) obtained from the above defined polymerization process is fed, typically in the form of pellets, optionally containing additives, to an extruding device. From the extruder the polymer melt is passed preferably through a multi-layer flat die to a chill roll for solidification. The co-extrusion will typically be performed with a melt temperature of the polypropylene composition (P) in the range of 180 to 260° C. and a chill roll temperature in the range of 10 to 60° C. While the polypropylene composition (P) will form one of the outermost layers of said multi-layer film, other layers may include other types of polypropylene and/or polyethylene homo- and/or copolymers. Further aspects and embodiments of the present invention are specified in the following paragraphs:

[1] Polypropylene composition (P), comprising at least 90.0 wt.-%, based on the overall weight of the polypropylene composition (P), of a copolymer (C) of propylene and 1-hexene, having
  i) an overall 1-hexene content in the range of 2.0 to 10.0 wt.-%,
  ii) a melt flow rate $MFR_2$ determined according to ISO 1133 (2.16 kg, 230° C.) in the range of 4.0 to 20.0 g/10 min, and
  iii) an amount of 2,1 erythro regio-defects of at least 0.2 mol.-%.

[2] Polypropylene composition (P) according to paragraph [1], wherein the copolymer (C) has a xylene soluble content (XCS) of at least 8.0 wt.-%.

[3] Polypropylene composition (P) according to paragraph [1] or [2], wherein the copolymer (C) comprises
  a) a first random propylene copolymer (A) of propylene and a 1-hexene having a comonomer content in the range of 0.1 to 4.0 wt.-%, and
  b) a second random propylene copolymer (B) of propylene and 1-hexene having a higher comonomer content than the first random propylene copolymer (A).

[4] Polypropylene composition (P) according to any one of the preceding paragraphs, wherein the copolymer (C) has a 1-hexene content of the xylene soluble fraction C6(XCS) in the range of 2.0 to 15.0 wt.-%.

[5] Polypropylene composition (P) according to any one of the preceding paragraphs, wherein the copolymer (C) comprises 30.0 to 70.0 wt.-% of the first random propylene copolymer (A) and 30.0 to 70.0 wt.-% of the second random propylene copolymer (B), based on the overall weight of the copolymer (C).

[6] Polypropylene composition (P) according to any one of the preceding paragraphs, wherein the copolymer (C) has a melting temperature Tm below 140° C.

[7] Polypropylene composition (P) according to any one of the preceding paragraphs, wherein the copolymer (C) fulfills in-equation (1)

$$4.50 \leq \frac{C6(C)}{C6(A) * \frac{[A]}{[C]}} \leq 9.00 \quad (1)$$

wherein
  C6(A) is the 1-hexene content of the first random propylene copolymer (A) based on the total weight of the first random propylene copolymer (A) [in wt.-%];
  C6(C) is the 1-hexene content of the copolymer (C) based on the total weight of the copolymer (C) [in wt.-%]; and
  [A]/[C] is the weight ratio between the first random propylene copolymer (A) and the copolymer (C) [in g/g].

[8] Polypropylene composition (P) according to any one of the preceding paragraphs, wherein the copolymer (C) has been visbroken with a visbreaking ratio (VR) in the range of 1.5 to 15.0, wherein the visbreaking is determined according to equation (2)

$$VR = \frac{MFR_{final}}{MFR_{start}} \quad (2)$$

wherein "$MFR_{final}$" is the melt flow rate $MFR_2$ determined according to ISO 1133 (230° C., 2.16 kg) of the copolymer (C) after visbreaking and "$MFR_{start}$" is the melt flow rate $MFR_2$ determined according to ISO 1133 (230° C., 2.16 kg) of the copolymer (C) before visbreaking.

[9] Polypropylene composition (P) according to paragraph [8], wherein the copolymer (C) has a melt flow rate $MFR_2$ determined according to ISO 1133 (230° C., 2.16 kg) before visbreaking in the range of 0.4 to below 4.0 g/10 min.

[10] Polypropylene composition (P) according to paragraph [8] or [9], wherein
  i) the first random propylene copolymer (A) has a melt flow rate $MFR_2$ (230° C., 2.16 kg) determined according to ISO 1133 before visbreaking in the range of 0.3 to 6.0 g/10 min, and/or
  ii) the second random propylene copolymer (B) has a melt flow rate $MFR_2$ (230° C., 2.16 kg) determined according to ISO 1133 before visbreaking in the range of 0.1 to 4.0 g/10 min.

[11] Process for the preparation of a copolymer (C) of propylene and 1-hexene, comprising the steps of
  a) preparing a copolymer (C') of propylene and 1-hexene having an overall 1-hexene content in the range of 2.0 to 10.0 wt.-% in the presence of a metallocene catalyst (MC),
  b) visbreaking the copolymer (C') obtained in step a) with a visbreaking ratio (VR) in the range of 1.5 to 15.0, thereby obtaining the copolymer (C), wherein the visbreaking is determined according to equation (3)

$$VR = \frac{MFR(C)}{MFR(C')} \quad (3)$$

wherein "MFR(C)" is the melt flow rate $MFR_2$ determined according to ISO 1133 (230° C., 2.16 kg) of the copolymer (C) after visbreaking and "MFR(C')" is the melt flow rate $MFR_2$ determined according to ISO 1133 (230° C., 2.16 kg) of the copolymer (C').

[12] Process according to paragraph [11], wherein the copolymer (C') of propylene and 1-hexene is prepared by
a1) polymerizing propylene and 1-hexene in a first reactor (R-1) in the presence of the metallocene catalyst (MC), thereby obtaining a first random propylene copolymer (A) having a 1-hexene content in the range of 0.1 to 4.0 wt.-%,
a2) transferring said first random propylene copolymer (A) and unreacted comonomers of the first reactor (R-1) in a second reactor (R-2), and
a3) polymerizing in said second reactor (R-2) and in the presence of said first random propylene copolymer (A) propylene and 1-hexene obtaining a second random propylene copolymer (B) having a higher comonomer content than the first random propylene copolymer (A), said first random propylene copolymer (A) and said second random propylene copolymer (B) forming the copolymer (C').

[13] Process according to any one of paragraphs [11] or [12], wherein
i) the melt flow rate $MFR_2$ determined according to ISO 1133 (230° C., 2.16 kg) of the copolymer (C) is in the range of 4.0 to 20.0 g/10 min and
ii) the melt flow rate $MFR_2$ determined according to ISO 1133 (230° C., 2.16 kg) of the copolymer (C') is in the range of 0.4 to below 4.0 g/10 min.

[14] Process according to any one of paragraphs [11] to [13], wherein the metallocene catalyst (MC) is of formula of formula (I)

$$R_n(Cp)_2MX_2 \quad (I)$$

wherein
each Cp independently is an unsubstituted or substituted and/or fused cyclopentadienyl ligand, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"$_3$, —OSiR"$_3$, —SR", —PR"$_2$, OR" or —NR"$_2$,
each R" is independently a hydrogen or hydrocarbyl selected from C1-C20-alkyl, C2-C20-alkenyl, C2-C20-alkynyl, C3-C12-cycloalkyl or C6-C20-aryl; or in case of —NR"$_2$, the two substituents R" can form a five- or six-membered ring, together with the nitrogen atom to which they are attached;
R is a bridge of 1-2 C-atoms and 0-2 heteroatoms, wherein the heteroatom(s) can be Si, Ge and/or O atom(s), wherein each of the bridge atoms may bear independently substituents selected from C1-C20-alkyl, tri(C1-C20-alkyl)silyl, tri(C1-C20-alkyl)siloxy or C6-C20-aryl substituents); or a bridge of one or two heteroatoms selected from silicon, germanium and/or oxygen atom(s),
M is a transition metal of Group 4 selected from Zr or Hf, especially Zr;
each X is independently a sigma-ligand selected from H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;
each of the above mentioned ring moieties alone or as a part of another moiety as the substituent for Cp, X, R" or R can further be substituted with C1-C20-alkyl which may contain Si and/or O atoms; and
n is 1 or 2.

[15] Process according to paragraph [14], wherein the metallocene catalyst (MC) of formula (I) is an organozirconium compound of formula (II) or (II')

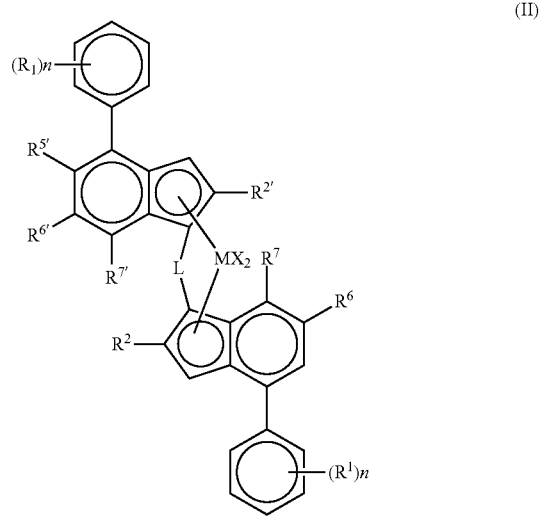

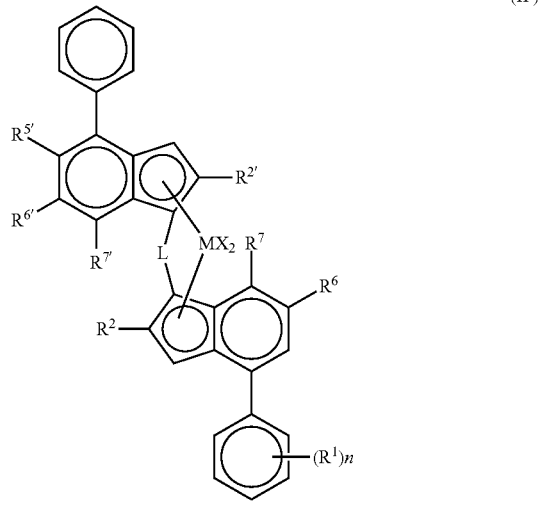

wherein
M is Zr;
each X is a sigma ligand, preferably each X is independently a hydrogen atom, a halogen atom, a C1-C6 alkoxy group, C1-C6 alkyl, phenyl or a benzyl group;

L is a divalent bridge selected from —R'$_2$C—, —R'$_2$C—CR'$_2$, —R'$_2$Si—, —R'$_2$Si—SiR'$_2$—, —R'$_2$Ge—, wherein each R' is independently a hydrogen atom, C1-C20 alkyl, C3-C10 cycloalkyl, tri(C1-C20-alkyl)silyl, C6-C20-aryl or C7-C20 arylalkyl;

each $R^2$ or $R^{2'}$ is a C1-C10 alkyl group;

$R^{5'}$ is a C1-C10 alkyl group or a Z'$R^{3'}$ group;

$R^6$ is hydrogen or a C1-C10 alkyl group;

$R^{6'}$ is a C1-C10 alkyl group or a C6-C10 aryl group;

$R^7$ is hydrogen, a C1-C6 alkyl group or a $ZR^3$ group;

$R^{7'}$ is hydrogen or a C1-C10 alkyl group;

Z and Z' are independently O or S;

$R^{3'}$ is a C1-C10 alkyl group, or a C6-C10 aryl group optionally substituted by one or more halogen groups;

$R^3$ is a C1-C10 alkyl group;

each n is independently 0 to 4;

and each $R^1$ is independently a C1-C20 hydrocarbyl group.

[16] Polypropylene composition (P), comprising at least 90 wt.-% of the copolymer (C) obtained according to the process according to any one of paragraphs [11] to [15].

[17] Article, preferably film, comprising at least 90.0 wt.-% of the polypropylene composition (P) according to any one of paragraphs [1] to [10] or [16].

[18] Use of the article according to paragraph [17] as a sealing layer in a multi-layer film.

In the following, the present invention is described by way of examples.

A. Measuring Methods

The following definitions of terms and determination methods apply for the above general description of the invention as well as to the below examples unless otherwise defined.

Comonomer Content of 1-Hexene for a Propylene 1-Hexene Copolymer

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382, Parkinson, M., Klimke, K., Spiess, H. W., Wilhelm, M., Macromol. Chem. Phys. 2007; 208:2128, Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207: 382, Pollard, M., Klimke, K., Graf, R., Spiess, H. W., Wilhelm, M., Sperber, O., Piel, C., Kaminsky, W., Macromolecules 2004; 37:813). and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I\alpha B4/2$$

The amount of 1-hexene incorporated in PHHP double consecutive sequences was quantified using the integral of the ααB4 site at 41.7 ppm accounting for the number of reporting sites per comonomer:

$$HH = 2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H = (I\alpha B4 - 2*I\alpha\alpha B4)/2$$

The total 1-hexene content was calculated based on the sum of isolated and consecutively incorporated 1-hexene:

$$H\text{total} = H + HH$$

When no sites indicative of consecutive incorporation observed the total 1-hexeen comonomer content was calculated solely on this quantity:

$$H\text{total} = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_s\alpha\alpha + 2*P21 + H + HH/2$$

The total amount of propene was quantified as the sum of primary (1,2) and secondary (2,1-erythro) inserted propene:

$$P\text{total} = P12 + P21 = I_s\alpha\alpha + 3*I\alpha\alpha 21e9 + (I\alpha B4 - 2*I\alpha\alpha B4)/2 + I\alpha\alpha B4$$

This simplifies to:

$$P\text{total} = I_s\alpha\alpha + 3*I\alpha\alpha 21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_s\alpha\alpha + 3*I\alpha\alpha 21e9 + 0.5*I\alpha B4) + ((I\alpha B4 - 2*I\alpha\alpha B4)/2) + (2*I\alpha\alpha B4))$$

This simplifies to:

$$fH=(I\alpha B4/2+I\alpha\alpha B4)/(I_s\alpha\alpha+3*I\alpha\alpha 21e9+I\alpha B4+I\alpha\alpha B4)$$

The total comonomer incorporation of 1-hexene in mole percent was calculated from the mole fraction in the usual manner:

$$H[\text{mol \%}]=100*fH$$

The total comonomer incorporation of 1-hexene in weight percent was calculated from the mole fraction in the standard manner:

$$H[\text{wt \%}]=100*(fH*84.16)/((fH*84.16)+((1-fH)*42.08))$$

Calculation of comonomer content of the second random propylene copolymer (B):

$$\frac{C(CPP)-w(A)xC(A)}{w(B)}=C(B)$$

wherein
w(A) is the weight fraction of the first random propylene copolymer (A),
w(B) is the weight fraction of the second random propylene copolymer (B),
C(A) is the comonomer content [in wt.-%] measured by $^{13}$C NMR spectroscopy of the first random propylene copolymer (A), i.e. of the product of the first reactor (R1),
C(CPP) is the comonomer content [in wt.-%] measured by $^{13}$C NMR spectroscopy of the product obtained in the second reactor (R2), i.e. the mixture of the first random propylene copolymer (A) and the second random propylene copolymer (B) [of the propylene copolymer (C-PP)],
C(B) is the calculated comonomer content [in wt.-%] of the second random propylene copolymer (B).

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg.

Calculation of melt flow rate MFR$_2$ (230° C.) of the second random propylene copolymer (B):

$$MFR(B)=10^{\left[\frac{\log(MFR(C))-w(A)x\log(MFR(A))}{w(B)}\right]}$$

wherein
w(A) is the weight fraction of the first random propylene copolymer (A),
w(B) is the weight fraction of the second random propylene copolymer (B),
MFR(A) is the melt flow rate MFR$_2$ (230° C., 2.16 kg) [in g/10 min] measured according ISO 1133 of the first random propylene copolymer (A),
MFR(C) is the melt flow rate MFR$_2$ (230° C., 2.16 kg) [in g/10 min] measured according ISO 1133 of the Polypropylene composition (P),
MFR(B) is the calculated melt flow rate MFR$_2$ (230° C., 2.16 kg) [in g/10 min] of the second random propylene copolymer (B).

The xylene cold solubles (XCS, wt.-%): Content of xylene cold solubles (XCS) is determined at 25° C. according ISO 16152; first edition; 2005 Jul. 1.

Hexane Hot Solubles (HHS, Wt.-%)
FDA section 177.1520
1 g of a polymer film of 50 or 100 µm thickness is added to 400 ml hexane at 50° C. for 2 hours while stirring with a reflux cooler.

After 2 hours the mixture is immediately filtered on a filter paper N°41.

The precipitate is collected in an aluminium recipient and the residual hexane is evaporated on a steam bath under N$_2$ flow.

The amount of hexane solubles is determined by the formula $$((\text{wt. sample}+\text{wt. crucible})-(\text{wt crucible}))/(\text{wt. sample})\cdot 100.$$

Melting temperature T$_m$, crystallization temperature Tc, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Haze was determined according to ASTM D1003-00 on cast films of 50 or 100 µm thickness produced on a monolayer cast film line with a melt temperature of 220° C. and a chill roll temperature of 20° C.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Sealing Initiation Temperature (SIT); Sealing End Temperature (SET), Sealing Range:

The method determines the sealing temperature range (sealing range) of polypropylene films, in particular blown films or cast films. The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range is determined on a J&B Universal Sealing Machine Type 3000 with a film of 50 or 100 µm thickness with the following further parameters:
Specimen width: 25.4 mm
Seal Pressure: 0.1 N/mm$^2$
Seal Time: 0.1 sec
Cool time: 99 sec
Peel Speed: 10 mm/sec
Start temperature: 80° C.
End temperature: 150° C.
Increments: 10° C.
specimen is sealed A to A at each sealbar temperature and seal strength (force) is determined at each step.

The temperature is determined at which the seal strength reaches 5 N.

Hot Tack Force:
The hot tack force is determined on a J&B Hot Tack Tester with a film of 50 or 100
µm thickness with the following further parameters:
Specimen width: 25.4 mm
Seal Pressure: 0.3 N/mm$^2$ Seal Time: 0.5 sec
Cool time: 99 sec
Peel Speed: 200 mm/sec
Start temperature: 90° C.
End temperature: 140° C.
Increments: 10° C.

The maximum hot tack force, i.e the maximum of a force/temperature diagram is determined and reported.

Tensile modulus in machine and transverse direction were determined according to ISO 527-3 on 50 or 100 m cast films at a cross head speed of 1 mm/min.

Impact strength of the cast film was determined by the "dynamic test (Dynatest)" method in accordance with ISO 7725-2 on the film. The value "W breaking" [J/mm] represents the total penetration energy per mm thickness that a film can absorb before it breaks.

2. EXAMPLES

Preparation of the Catalyst

The catalyst used in the inventive example IE is prepared as described in detail in WO 2015/011135 A1 (metallocene complex MCi with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MCi in WO 2015/011135 A1) is prepared as described in WO 2013/007650 A1 (metallocene E2 in WO 2013/007650 A1).

The catalyst used in the comparative example CE2, which is identical to inventive example IE3 of EP 2 386 603 A1, is described in example 1 of EP 1 741 725 A1.

Preparation of the Polypropylene Composition (P)

The polypropylene composition (P) was prepared in a sequential process comprising a loop reactor and a gas phase reactor. The reaction conditions are summarized in Table 1. Table 2 contains the properties of the comparative and inventive examples.

The polypropylene composition (P) was visbroken in a twin-screw extruder using an appropriate amount of (tert.-butylperoxy)-2,5-dimethylhexane (Trigonox 101, distributed by Akzo Nobel, Netherlands) to achieve the target MFR$_2$ as mentioned in Table 2.

TABLE 1

Preparation of the Polypropylene composition (P)

|  |  | IE | CE2 |
|---|---|---|---|
| Prepolymerization |  |  |  |
| Temperature | [° C.] | 20 | n.d. |
| Catalyst feed | [g/h] | 2.5 | n.d. |
| TEAL/C3 | [g/t] | 0 | n.d. |
| C3 feed | [kg/h] | 60.9 | n.d. |
| H2 feed | [g/h] | 0.5 | n.d. |
| Residence time | [h] | 0.2 | n.d. |
| Loop (R1) |  |  |  |
| Temperature | [° C.] | 70 | n.d. |
| Pressure | [kPa] | 5297 | n.d. |
| H2/C3 ratio | [mol/kmol] | 0.08 | n.d. |
| C6/C3 ratio | [mol/kmol] | 15.5 | n.d. |
| MFR$_2$ | [g/10 min] | 1.9 | 1.1 |
| XCS | [wt.-%] | 1.9 | 1.0 |

TABLE 1-continued

Preparation of the Polypropylene composition (P)

|  |  | IE | CE2 |
|---|---|---|---|
| C6 | [wt.-%] | 1.7 | 0.0 |
| Residence time | [h] | 0.5 | n.d. |
| Split | [wt.-%] | 42.5 | 38 |
| GPR (R2) |  |  |  |
| Temperature | [° C.] | 80 | n.d. |
| Pressure | [kPa] | 2406 | n.d. |
| H2/C3 ratio | [mol/kmol] | 0.3 | n.d. |
| C6/C3 ratio | [mol/kmol] | 8.7 | n.d. |
| C6 (GPR) | [wt.-%] | 6.9 | 7.6 |
| MFR$_2$ (GPR) | [g/10 min] | 1.1 | 27.5 |
| Residence time | [h] | 2.6 | n.d. |
| Split | [wt.-%] | 57.5 | 62 |
| MFR$_2$ (before visbreaking) | [g/10 min] | 1.5 | 8.1 |
| MFR(C)/MFR(A) | [-] | 0.74 | 7.4 |
| XCS (before visbreaking) | [wt.-%] | 11.1 | 3.0 |
| C6(XCS) | [wt %] | 7.4 | n.d. |

TABLE 2

Properties of the comparative and inventive examples

|  |  | IE | CE1 | CE2 |
|---|---|---|---|---|
| MFR$_2$ (after visbreaking) | [g/10 min] | 9.0 | 8.0 | 8.1 |
| C6 | [wt.-%] | 5.0 | 0.0 | 4.7 |
| Tm | [° C.] | 136 | 140 | 148 |
| XCS | [wt.-%] | 11.0 | 10.0 | 3.0 |
| C6 FDA | [wt.-%] | 0.8 | 2.0 | 1.2 |
| 1, 2e CF film | [mol-%] | 0.46 | 0.0 | n.d. |
| Thickness | [µm] | 50 | 50 | 100 |
| SIT | [° C.] | 105 | 114 | 104 |
| Tm – SIT | [° C.] | 31 | 26 | 34 |
| HTF | [N] | 2.7 | 2.0 | 3.1 |
| TM/MD | [MPa] | 434 | 434 | 495 |
| TM/TD | [MPa] | 432 | 432 | 503 |
| W$_{tot}$ (Dynatest) | [J/mm] | 26.0 | 15.0 | n.d. |
| Haze b.s. | [%] | 0.3 | 0.2 | n.d. |
| Haze a.s. | [%] | 0.6 | 15 | n.d. |

CE1 is the commercial copolymer of propylene and 4.5 wt % ethylene RD208CF of Borealis having a melt flow rate of 8.0 g/10 min which is produced by visbreaking a reactor-grade PP based on a Ziegler-Natta type catalyst to achieve the target MFR.

As can be gathered from Table 2, the haze after sterilization of the inventive compositions having an amount of 2,1 erythro regio-defects above 0.2 mol-% is significantly lower than the corresponding value of the comparative example, while the tensile modulus remains on the same level.

The invention claimed is:

1. A polypropylene composition (P), comprising at least 90.0 wt-%, based on an overall weight of the polypropylene composition (P), of a copolymer (C) of propylene and 1-hexene, having
   i) an overall 1-hexene content in a range of 2.0 to 10.0 wt-%,
   ii) a melt flow rate MFR$_2$ determined according to ISO 1133 (2.16 kg, 230° C.) in a range of 4.0 to 20.0 g/10 min, and
   iii) an amount of 2,1 erythro regio-defects of at least 0.2 mol-%,
   wherein the copolymer (C) has been visbroken with a visbreaking ratio (VR) in a range of 1.5 to 15.0, wherein the visbreaking ratio is determined according to equation (2)

$$VR = \frac{MFR_{final}}{MFR_{start}} \quad (2)$$

wherein "$MFR_{final}$" is the melt flow rate $MFR_2$ determined according to ISO 1133 (230° C., 2.16 kg) of the copolymer (C) after visbreaking and "$MFR_{start}$" is the melt flow rate $MFR_2$ determined according to ISO 1133 (230° C., 2.16 kg) of the copolymer (C) before visbreaking.

2. The polypropylene composition (P) according to claim 1, wherein the copolymer (C) has a xylene soluble content (XCS) of at least 8.0 wt-%.

3. The polypropylene composition (P) according to claim 1, wherein the copolymer (C) comprises
   a) a first random propylene copolymer (A) of propylene and a 1-hexene having a comonomer content in a range of 0.1 to 4.0 wt-%, and
   b) a second random propylene copolymer (B) of propylene and 1-hexene having a higher comonomer content than that of the first random propylene copolymer (A).

4. The polypropylene composition (P) according to claim 1, wherein the copolymer (C) has a 1-hexene content of a xylene soluble fraction C6(XCS) in a range of 2.0 to 15.0 wt-%.

5. The polypropylene composition (P) according to claim 3, wherein the copolymer (C) comprises 30.0 to 70.0 wt-% of the first random propylene copolymer (A) and 30.0 to 70.0 wt-% of the second random propylene copolymer (B), based on an overall weight of the copolymer (C).

6. The polypropylene composition (P) according to claim 3, wherein the copolymer (C) has a melting temperature Tm below 140° C.

7. The polypropylene composition (P) according to claim 3, wherein the copolymer (C) fulfills in-equation (1)

$$4.50 \leq \frac{C6(C)}{C6(A) * \frac{[A]}{[C]}} \leq 9.00 \quad (1)$$

wherein
C6(A) is 1-hexene content of the first random propylene copolymer (A) based on a total weight of the first random propylene copolymer (A) in wt-%;
C6(C) is 1-hexene content of the copolymer (C) based on a total weight of the copolymer (C) in wt-%; and
[A]/[C] is weight ratio between the first random propylene copolymer (A) and the copolymer (C) in [g/g].

8. The polypropylene composition (P) according to claim 1, wherein the copolymer (C) has a melt flow rate $MFR_2$ determined according to ISO 1133 (230° C., 2.16 kg) before visbreaking in a range of 0.4 to 3.5 g/10 min.

9. The polypropylene composition (P) according to claim 1, wherein
   i) a first random propylene copolymer (A) has a melt flow rate $MFR_2$ (230° C., 2.16 kg) determined according to ISO 1133 before visbreaking in a range of 0.3 to 6.0 g/10 min, and/or
   ii) a second random propylene copolymer (B) has a melt flow rate $MFR_2$ (230° C., 2.16 kg) determined according to ISO 1133 before visbreaking in a range of 0.1 to 4.0 g/10 min.

10. A process for the preparation of a copolymer (C) of propylene and 1-hexene, comprising the steps of a) preparing a copolymer (C') of propylene and 1-hexene having an overall 1-hexene content in a range of 2.0 to 10.0 wt.-% in the presence of a metallocene catalyst (MC),
b) visbreaking the copolymer (C') obtained in step a) with a visbreaking ratio (VR) in a range of 1.5 to 15.0, thereby obtaining the copolymer (C),
wherein the visbreaking ratio is determined according to equation (3)

$$VR = \frac{MFR(C)}{MFR(C')} \quad (3)$$

wherein "MFR(C)" is a melt flow rate $1MFR_2$ determined according to ISO 1133 (230° C., 2.16 kg) of the copolymer (C) after visbreaking and "MFR(C')" is melt flow rate $MFR_2$ determined according to ISO 1133 (230° C., 2.16 kg) of the copolymer (C').

11. The process according to claim 10, wherein the copolymer (C') of propylene and 1-hexene is prepared by
   a1) polymerizing propylene and 1-hexene in a first reactor (R-1) in the presence of the metallocene catalyst (MC), thereby obtaining a first random propylene copolymer (A) having a 1-hexene content in a range of 0.1 to 4.0 wt-%,
   a2) transferring said first random propylene copolymer (A) and unreacted comonomers of the first reactor (R-1) into a second reactor (R-2), and
   a3) polymerizing in said second reactor (R-2) and in the presence of said first random propylene copolymer (A), propylene and 1-hexene and obtaining a second random propylene copolymer (B) having a higher comonomer content than that of the first random propylene copolymer (A), said first random propylene copolymer (A) and said second random propylene copolymer (B) forming the copolymer (C').

12. The process according to claim 10, wherein
   i) the melt flow rate $MFR_2$ determined according to ISO 1133 (230° C., 2.16 kg) of the copolymer (C) is in a range of 4.0 to 20.0 g/10 min and
   ii) the melt flow rate $1MFR_2$ determined according to ISO 1133 (230° C., 2.16 kg) of the copolymer (C') is in a range of 0.4 to below 4.0 g/10 min.

13. The process according to claim 10, wherein the metallocene catalyst (MC) is of formula (I)

$$R_n(Cp)_2MX_2 \quad (I)$$

wherein
each Cp independently is an unsubstituted or substituted and/or fused cyclopentadienyl ligand, substituted or unsubstituted indenyl or substituted or unsubstituted fluorenyl ligand; wherein the optional one or more substituent(s) are independently selected from the group consisting of halogen, hydrocarbyl, $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$, OR", and —NR"$_2$,
wherein each R" is independently a hydrogen or hydrocarbyl selected from the group consisting of $C_1$-$C_{20}$-alkyl, $C_2$-$C_{20}$-alkenyl, $C_2$-$C_{20}$-alkynyl, $C_3$-$C_{12}$-cycloalkyl, and $C_6$-$C_{20}$-aryl; or in case of —NR"$_2$, the two substituents R" can form a five- or six-membered ring, together with the nitrogen atom to which they are attached;

R is a bridge of 1-2 C-atoms and 0-2 heteroatoms, wherein the heteroatom(s) are Si, Ge and/or O atom(s), wherein each of the bridge atoms may bear independently substituents selected from the group consisting of $C_1$-$C_{20}$-alkyl, tri($C_1$-$C_{20}$-alkyl)silyl, tri($C_1$-$C_{20}$-alkyl)siloxy and $C_6$-$C_{20}$-aryl substituents; or a bridge of one or two heteroatoms selected from silicon, germanium and oxygen atom(s), M is a transition metal of Group 4 selected from Zr or Hf;

each X is independently a sigma-ligand selected from the group consisting of H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR'', —PR''$_3$, —SiR''$_3$, —OSiR''$_3$, —NR''$_2$ and —$CH_2$—Y, wherein Y is $C_6$-$C_{20}$-aryl, $C_6$-$C_{20}$-heteroaryl, $C_1$-$C_{20}$-alkoxy, $C_6$-$C_{20}$-aryloxy, NR''$_2$, —SR'', —PR''$_3$, —SiR''$_3$, and —OSiR''$_3$;

each of the above mentioned ring moieties alone or as a part of another moiety as the substituent for Cp, X, R'' or R can further be substituted with $C_1$-$C_{20}$-alkyl which may contain Si and/or O atoms; and n is 1 or 2.

14. The process according to claim 13, wherein the metallocene catalyst (MC) of formula (I) is an organo-zirconium compound of formula (II) or (II')

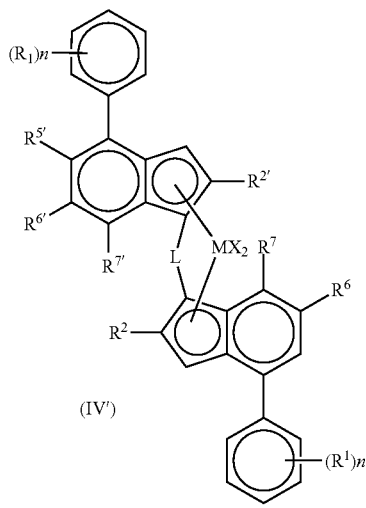

(II)

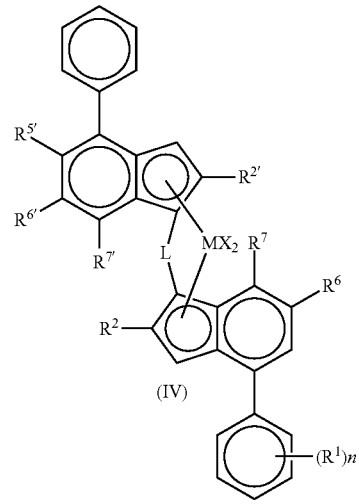

(II')

wherein

M is Zr;

each X is independently a sigma-ligand selected from the group consisting of H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR'', —PR''$_3$, —SiR''$_3$, —OSiR''$_3$, —NR''$_2$ and —$CH_2$—Y;

L is a divalent bridge selected from the group consisting of —R'$_2$C—, —R'$_2$C—CR'$_2$, —R'$_2$Si—, —R'$_2$Si—SiR'$_2$—, and —R'$_2$Ge—, wherein each R' is independently a hydrogen atom, $C_1$-$C_{20}$ alkyl, $C_3$-$C_{10}$ cycloalkyl, tri($C_1$-$C_{20}$-alkyl)silyl, $C_6$-$C_{20}$-aryl, or $C_7$-$C_{20}$ arylalkyl;

each $R^2$ or $R^{2'}$ is a $C_1$-$C_{10}$ alkyl group;

$R^{5'}$ is a $C_1$-$C_{10}$ alkyl group or a Z'$R^{3'}$ group;

$R^6$ is hydrogen or a $C_1$-$C_{10}$ alkyl group;

$R^{6'}$ is a $C_1$-$C_{10}$ alkyl group or a $C_6$-$C_{10}$ aryl group;

$R^7$ is hydrogen, a $C_1$-$C_6$ alkyl group or a $ZR^3$ group;

$R^{7'}$ is hydrogen or a $C_1$-$C_{10}$ alkyl group;

Z and Z' are independently O or S;

$R^{3'}$ is a $C_1$-$C_{10}$ alkyl group, or a $C_6$-$C_{10}$ aryl group optionally substituted by one or more halogen groups;

$R^3$ is a $C_1$-$C_{10}$ alkyl group;

each n is independently 0 to 4;

and each $R^1$ is independently a $C_1$-$C_{20}$ hydrocarbyl group.

15. A polypropylene composition (P), comprising at least 90 wt % of the copolymer (C) obtained according to the process according to claim 10.

16. An article comprising at least 90.0 wt-% of the polypropylene composition (P) according to claim 1.

* * * * *